US008866439B2

(12) United States Patent
Pukari et al.

(10) Patent No.: US 8,866,439 B2
(45) **Date of Patent: *Oct. 21, 2014**

(54) ELECTROMECHANICAL LOCK AND ITS OPERATION METHOD USING MECHANICAL POWER FROM NORMAL OPERATION FOR SETTING ELECTROMECHANICAL LOCK IN A MECHANICALLY OPENABLE STATE

(75) Inventors: Mika Pukari, Oulu (FI); Hannu Jokinen, Oulunsalo (FI)

(73) Assignee: iLOQ Oy, Oulu (FI)

( * ) Notice: Subject to any disclaimer, the term of this patent is extended or adjusted under 35 U.S.C. 154(b) by 408 days.

This patent is subject to a terminal disclaimer.

(21) Appl. No.: 13/351,418

(22) Filed: Jan. 17, 2012

(65) Prior Publication Data

US 2012/0111072 A1 May 10, 2012

Related U.S. Application Data

(63) Continuation of application No. 12/086,492, filed as application No. PCT/FI2006/050543 on Dec. 8, 2005, now Pat. No. 8,228,030.

(30) Foreign Application Priority Data

Dec. 16, 2005 (EP) .................................... 05112272

(51) Int. Cl.
*H02J 7/00* (2006.01)
*E05B 47/06* (2006.01)
*E05B 49/00* (2006.01)
*G07C 9/00* (2006.01)
*E05B 47/00* (2006.01)

(52) U.S. Cl.
CPC .... *E05B 47/063* (2013.01); *G07C 2009/00634* (2013.01); *G07C 9/00896* (2013.01); *G07C 2009/00769* (2013.01); *E05B 2047/0062* (2013.01); *G07C 9/00309* (2013.01)
USPC ......... 320/114; 70/278.3; 70/278.2; 70/278.7

(58) Field of Classification Search
USPC ........ 320/114; 70/278.3, 278.2, 278.7, 279.1, 70/283.1
See application file for complete search history.

(56) References Cited

U.S. PATENT DOCUMENTS 3,733,861 A 5/1973 Lester
5,265,452 A 11/1993 Dawson et al.
5,896,026 A 4/1999 Higgins
6,038,894 A 3/2000 Hu
6,237,379 B1 * 5/2001 Hotzl .......................... 70/279.1

(Continued)

FOREIGN PATENT DOCUMENTS

DE 198 29 927 A1 1/2000
EP 0 462 316 A1 12/1991

(Continued)

*Primary Examiner* — Jay Patidar
(74) *Attorney, Agent, or Firm* — Birch, Stewart, Kolasch & Birch, LLP

(57) ABSTRACT

Electromechanical lock and its operation method are provided. The lock includes a threshold device configured to control the power transmission mechanism so that the amount of the received mechanical power in the form of the electric power is sufficient for powering the electronic circuit and the actuator, and so that a normal operation of the electromechanical lock, including an insertion of the key into the electromechanical lock, is sufficient for power the electronic circuit and the actuator.

21 Claims, 7 Drawing Sheets

(56) References Cited

U.S. PATENT DOCUMENTS

| | | | |
|---|---|---|---|
| 6,314,773 | B1 | 11/2001 | Miller et al. |
| 6,370,928 | B1 | 4/2002 | Chies et al. |
| 2004/0068935 | A1 | 4/2004 | Ichikawa et al. |

FOREIGN PATENT DOCUMENTS

| | | | |
|---|---|---|---|
| EP | 0 877 135 | A2 | 11/1998 |
| FR | 2 500 520 | A1 | 8/1982 |
| JP | 62-94678 | A | 5/1987 |
| JP | 3-47381 | A | 2/1991 |
| JP | 11-71947 | A | 3/1999 |
| JP | 2000-356055 | A | 12/2000 |
| JP | 2004-108035 | A | 4/2004 |
| JP | 2004-204441 | A | 7/2004 |
| JP | 2004-285638 | A | 10/2004 |
| JP | 2005-23581 | A | 1/2005 |
| JP | 2005-226284 | A | 8/2005 |
| JP | 2005-314962 | A | 11/2005 |
| WO | WO 96/02721 | A1 | 2/1996 |
| WO | WO 99/18310 | A1 | 4/1999 |
| WO | WO 02/29187 | A1 | 4/2002 |

* cited by examiner

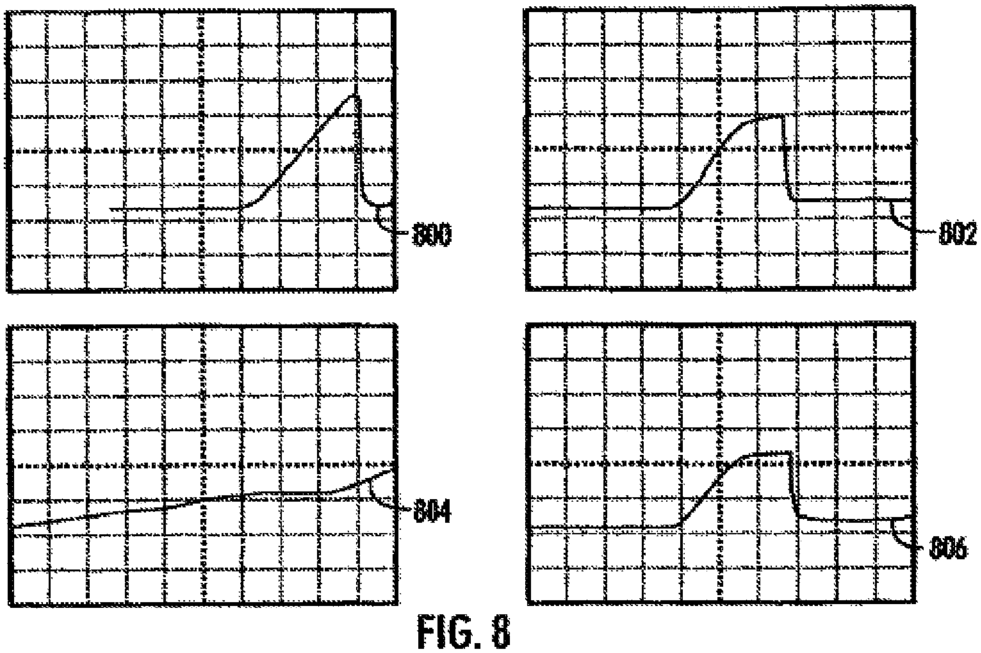
FIG. 8
FIG. 9A
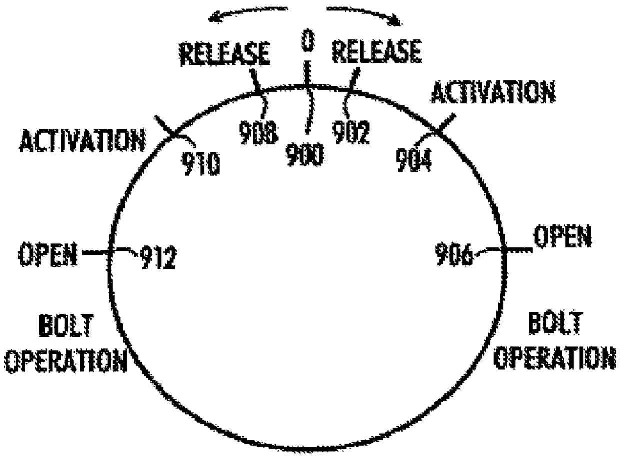
FIG. 9B
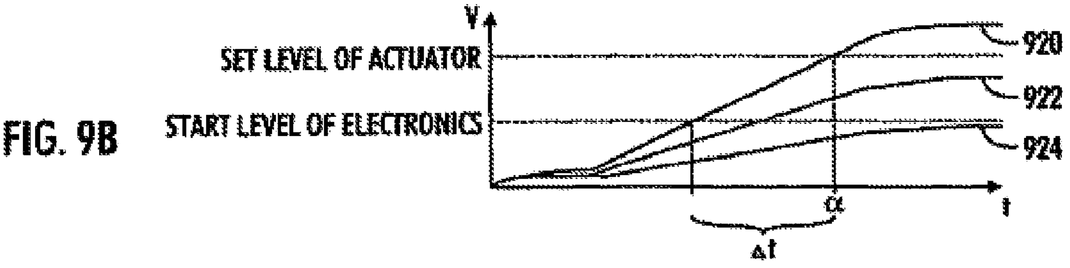

ELECTROMECHANICAL LOCK AND ITS OPERATION METHOD USING MECHANICAL POWER FROM NORMAL OPERATION FOR SETTING ELECTROMECHANICAL LOCK IN A MECHANICALLY OPENABLE STATE

CROSS-REFERENCE TO RELATED APPLICATIONS

This application is a Continuation of application Ser. No. 12/086,492 filed on Apr. 1, 2009 now U.S. Pat. No. 8,228,030, which is the national phase of PCT International Application No. PCT/FI2006/050543 filed on Dec. 8, 2006, and which claims priority to Application No. 05112272.9 filed in Europe on Dec. 16, 2005. The entire contents of all of the above applications are hereby incorporated by reference.

FIELD

The invention relates to an electromechanical lock and a method for operating an electromechanical lock.

BACKGROUND

Various types of electromechanical locks are replacing the traditional mechanical locks. One problem associated with the replacement is that a normal electromechanical lock requires an external supply for electric power, or a battery inside the lock, or a battery inside the key. Wiring of the lock may become necessary, if there is a battery outside the lock, or mains and a voltage transformer with wiring.

To combat this problem, self-powered electromechanical locks are currently emerging: as disclosed in EP 0877135 and U.S. Pat. No. 5,896,026, for example.

Still, more refinement is needed, especially in order to make the self-powered electromechanical locks more user friendly, especially in terms of the generation of the electric power from the mechanical power, and keeping the user interface similar to that of a mechanical lock.

BRIEF DESCRIPTION OF THE INVENTION

The present invention seeks to provide an improved electromechanical lock, and an improved method for operating an electromechanical lock.

According to an aspect of the invention, there is provided an electromechanical lock, comprising: a power transmission mechanism to receive mechanical power produced by a user of the lock; a generator to produce electric power from the mechanical power; an electronic circuit, powered by the electric power, coupleable with a key, to read data from the key, and to issue an open command provided that the data matches a predetermined criterion; and an actuator, powered by the electric power, to receive the open command, and to set the lock in a mechanically openable state. The lock further comprises: a threshold device to control the power transmission mechanism so that a mechanical tension rises until a predetermined force threshold is exceeded, whereupon the mechanical tension transforms to an action producing the mechanical power received by the power transmission mechanism.

According to another aspect of the invention, there is provided an electromechanical lock, comprising: receiving means for receiving mechanical power produced by a user of the lock; means for producing electric power from the mechanical power; means, powered by the electric power, coupleable with a key, for reading data from the key, and issuing an open command provided that the data matches a predetermined criterion; and means, powered by the electric power, for receiving the open command, and setting the lock in a mechanically openable state. The lock further comprises: means for controlling the receiving means so that a mechanical tension rises until a predetermined force threshold is exceeded, whereupon the mechanical tension transforms to an action producing the mechanical power received by the receiving means.

According to another aspect of the invention, there is provided a method for operating an electromechanical lock, comprising: receiving mechanical power produced by a user of the lock; producing electric power from the mechanical power; reading data from a key with the electric power; and setting the lock in a mechanically openable state with the electric power, provided that the data matches a predetermined criterion. The method further comprises: controlling the reception of the mechanical power so that a mechanical tension rises until a predetermined force threshold is exceeded, whereupon the mechanical tension transforms to an action received as the mechanical power.

The invention provides several advantages. A sophisticated electric power generation mechanism may be fitted into a tight space. The same applies to the electronic circuit and the actuator. It becomes possible to replace the existing mechanical key cylinder with the novel electromechanical key cylinder, without any changes around the lock. In some cases it may even be possible that the existing lock case remains in place, in spite of the change. The invention also ensures that enough electric power may be produced with an action comparable to handling of an ordinary mechanical lock.

LIST OF DRAWINGS

In the following, embodiments of the invention will be described, by way of example only, and with reference to the accompanying drawings, in which FIGS. 1, 2 and 3 illustrate various embodiments of a turn-powered electromechanical lock;

FIG. 8 illustrates the technical effect obtained with the use of the threshold device;

FIG. 9A illustrates an embodiment of the turn-powered lock;

FIG. 9B illustrates electric power curves;

DESCRIPTION OF EMBODIMENTS

Figure 1:
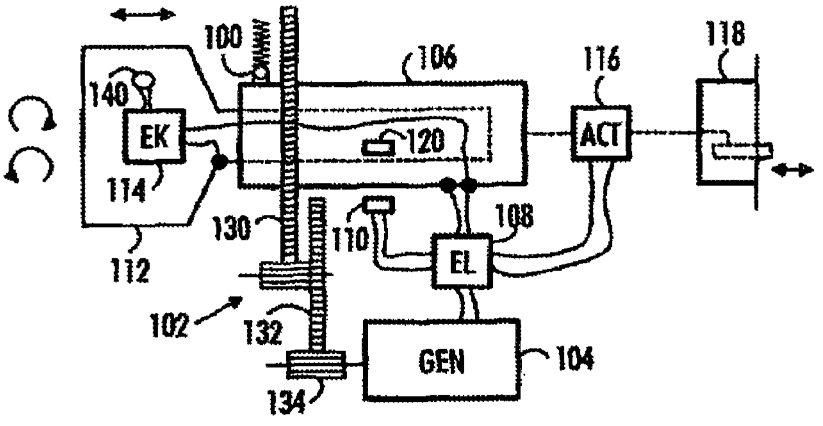
Figure 2:
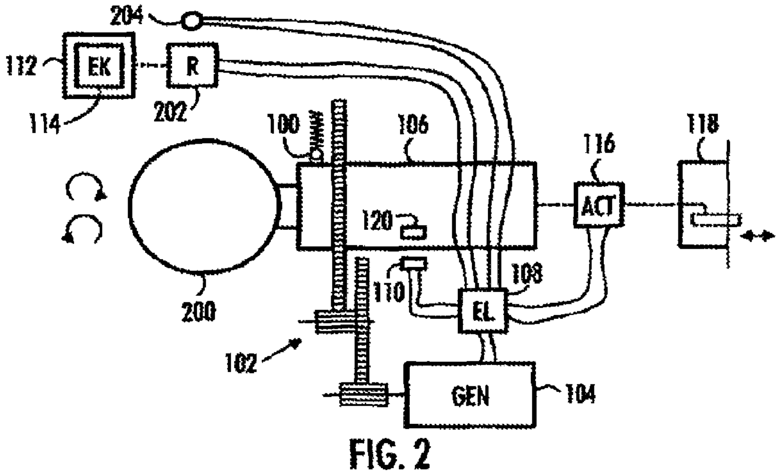
Figure 3:
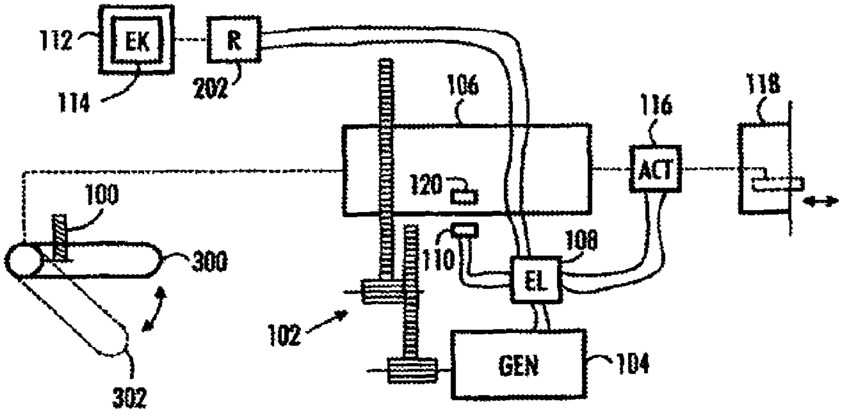

FIGS. 1, 2 and 3 illustrate various turn-powered electromechanical locks: the lock comprises a power transmission mechanism 102 to receive mechanical power produced by a user of the lock.

In FIG. 1, the power transmission mechanism 102 comprises a mechanism to receive the mechanical power while the user is turning a key 112 in the lock, in FIG. 2, a knob 200 to receive the mechanical power while the user is turning the knob 200, and in FIG. 3, a handle 300 to receive the mechanical power while the user is turning the handle 300. Other suitable turning mechanisms may be used as the power transmission mechanism 102 as well.

The lock further comprises a generator 104 to produce electric power from the mechanical power. The generator 104 may be a permanent magnet generator. The output power of the generator 104 depends on rotating speed, terminal resistance and terminal voltage of the electronic and the constants of the generator 104. The generator constants are set when the generator 104 is selected. The generator 104 may be implemented by a Faulhaber motor 0816006S, which is used as a generator, for example.

The power transmission mechanism 102 may comprise a main shaft 106 of the lock, which is rotated during the reception of the mechanical power.

One possible implementation of the power transmission mechanism 102 is illustrated in FIG. 1: around the main shaft 106 of the lock is connected a gear wheel 130. The generator 104 may comprise a generator shaft 134, and the lock may further comprise a gear 132 between the main shaft 106 of the lock and the generator shaft 134. When the user of the lock is turning the key 112 in the lock, as a part of the opening process, the main shaft 106 turns and with it also the gear wheel 130. The gear wheel 130 then turns the gear 132 that rotates the generator shaft 134. In effect, the generator 104 is rotated by the user of the lock.

As illustrated by arrows in FIG. 1, the key 112 may be rotated both in clockwise and anti-clockwise directions in order to produce electric energy with the generator 104. In FIG. 2, the turning of the key is replaced by the turning of the knob 200, and in FIG. 3 by the turning of the handle 300.

The lock further comprises an electronic circuit 108 powered by the electric power produced with the generator 104. The electronic circuit 108 is coupled with a key 112 in order to read data from the key 112. The electronic circuit 108 is configured to authenticate the key 112: if the data read from the key 112 matches a predetermined criterion, an open command is issued, otherwise the lock remains locked. The electronic circuit 108 may be implemented as one or more integrated circuits, such as application-specific integrated circuits ASIC. Other embodiments are also feasible, such as a circuit built of separate logic components, or a processor with its software. A hybrid of these different embodiments is also feasible. When selecting the method of implementation, a person skilled in the art will consider the requirements set on the power consumption of the device, production costs, and production volumes, for example.

In FIG. 1, the key 112 comprises an electronic circuit 114 including the data read by the electronic circuit 108. In FIGS. 2 and 3, other turning devices, i.e. the knob 200 and the handle 300, have replaced the traditionally formed key 112: therefore, the electronic circuit 114 may be encapsulated in any desirable format of the key 112. The only requirement is that a reader 202 of the lock, coupled with the electronic circuit 108, be capable of reading the data from the electronic circuit 114. The reader 202 may be configured to read the electronic circuit 114 with any appropriate wireless or wired technique, provided that enough energy may be produced for using the technique. Such techniques include, but are not limited to, data transmission techniques utilizing electric and/or magnetic principles. Wired technologies may include iButton technology (www.ibutton.com), traditional magnetic stripe technology, or smart card technology, for example. Wireless technologies may include rfid technology, or mobile phone technology, for example. The electronic circuit 114 may include a so-called transponder, an RF tag, or any other suitable memory type capable of storing the necessary data.

The lock may be programmable, as the data contained in the electronic circuit 114 as well as the predetermined criterion contained in the electronic circuit 108 may be altered with a suitable programming device.

The lock further comprises an actuator 116, also powered by the electric power produced with the generator 104. The actuator 116 is configured to receive the open command from the electronic circuit 108, and to set the lock in a mechanically openable state. The actuator 116 may be set to the locked state mechanically, but a detailed discussion of that is not necessary in order to shed light on the present embodiments.

The lock may further comprise a clutch (not illustrated) coupled with the actuator 116. The clutch may be an on/off type clutch. The actuator 116 may permit/prohibit the operation of the clutch. With or without the clutch, the actuator 116 may interact with a bolt mechanism 118 of the lock. FIGS. 1, 2 and 3 illustrate how the bolt mechanism of the lock may be operated, in the directions of the arrow, into an open or a closed position. The bolt mechanism 118 of the lock may be configured and positioned so that it is opened with the mechanical power created by the user, such as the further turning of the main shaft 106 of the lock, provided that the actuator 116 has been moved to the open position. The bolt mechanism 118 of the lock cannot be opened if the actuator 116 is kept in the locked (default) position.

In FIGS. 1, 2 and 3, an electromechanical programmable self-powered lock where power for the electronic circuit 108 and the actuator 116 is produced from a mechanic work done by the user has been disclosed. Such a lock does not need a battery or any other external power supply. The lock electronic circuit 108 is started when the specified voltage level is reached, the key 112 data is read, the key 112 is authenticated and the actuator 116 is activated if the key 112 has the access for the lock.

The lock further comprises a threshold device 100 to control the power transmission mechanism 102 so that a mechanical tension rises until a predetermined force threshold is exceeded, whereupon the mechanical tension transforms to an action producing the mechanical power received by the power transmission mechanism 102.

In effect, the threshold device 100 is configured to control a muscular tension of a user of the lock. If we study FIGS. 1, 2 and 3, we notice that when the user tries to turn the key 112, knob 200 or handle 300, a muscular tension of the user rises until a predetermined force threshold is exceeded, whereupon the muscular tension of the user transforms to a muscular action of the user. The key 112, knob 200 or handle 300 does not move in the tension phase, or moves only a little, only after the release in the action phase do they move receiving the mechanical power from the user. We will describe later, with reference to FIG. 7, how the control of the muscular action of the user by the threshold device 100, may be replaced with the control of a spring or other mechanical energy storage by the threshold device 100.

The threshold device 100 may be configured to control the power transmission mechanism 102 so that the amount of the received mechanical power in the form of the electric power is sufficient for powering the electronic circuit 108 and the actuator 116. The predetermined force threshold may be calculated so that enough tension is built in order to produce a sufficient amount of energy in the action phase.

The threshold device 100 may be configured so that one operating cycle of the power transmission mechanism 102 by the user of the lock is sufficient for powering the electronic circuit 108 and the actuator 116. With one operating cycle we refer to a 45, 90 or 180 degree turning of the key 112, or one turning of the handle (to position 302), for example.

The threshold device 100 may be configured so that a normal operation of the lock, including an insertion of the key 112 into the lock and/or a turning of the key 112 in the lock, is sufficient for powering the electronic circuit 108 and the actuator 116. The turning of the key 112 is illustrated in FIG. 1, and the insertion of the key 112 will be described with reference to FIGS. 5, 6 and 7.

The electronic circuit 108 may be configured to recognize the following states: the lock is in the mechanically openable state; the lock is closed and the data does not match the predetermined criterion; and the lock is closed and there was not enough electric energy to read the data from the key and to check the match of the data by the electronic circuit or to place the lock in the mechanically openable state by the actuator.

The electronic circuit 108 may be configured to provide a signal for the key 112 if the open command is not issued because the data does not match the predetermined criterion, so that the key 112 may inform the user that the data did not match the predetermined criterion. As a further improvement, the electronic circuit 108 may be configured to provide electric power for the key 112. An advantage of this is that that the key 112 may inform the user with the electric power received from the electronic circuit 108. The key 112 may inform the user with a red led lamp 140, as illustrated in FIG. 1, for example. Other methods for informing the user may naturally be used as well, such as other light sources or sound. A device 204 for informing the user may also be coupled with the lock, as illustrated in FIG. 2.

FIGS. 4A, 4B, 4C, 4D, 4E and 4F illustrate various embodiments of the threshold device 100.

Figure 4A:
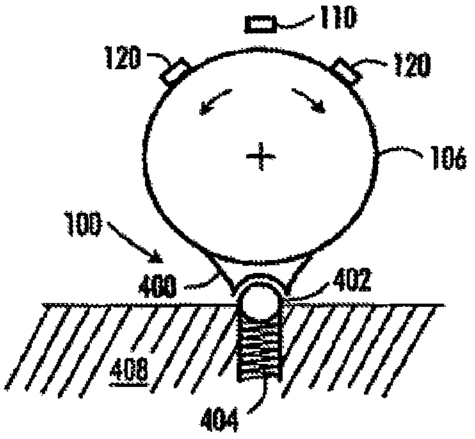
FIGS. 4A, 4B, 4C, 4D, 4E and 4F illustrate various embodiments of a threshold device.
Figure 4B:
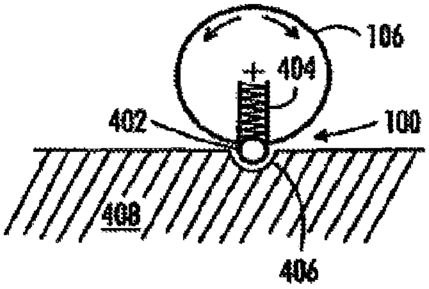

In FIG. 4A, the threshold device 100 comprises a ball 402 (or a roll) and a spring 404 in the body 408 of the lock. The turning part 106 of the lock may comprise a clamp 400 for the ball 402. Also such an embodiment of FIG. 4B is feasible where the ball 402 (or the roll) and the spring 404 are located in the turning part 106, and the body 408 of the lock may comprise a recess 406 accommodating a part of the ball 402. The function of the clamp 400 or the recess 406 is to further regulate the blocking force of the ball 402, besides the force generated by the spring 404.

Figure 4C:
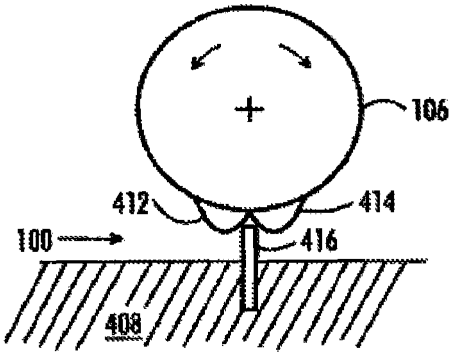
Figure 4D:
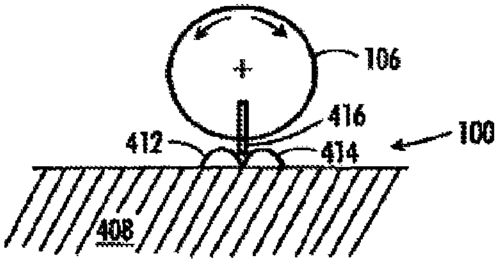

In FIG. 4C, the threshold device 100 comprises a bending spring bar 416 in the body 408 of the lock. The turning part 106 of the lock may comprise two members 412, 414 at both sides of the bending spring bar 416. Also such an embodiment is feasible, illustrated in FIG. 4D, where the bending spring bar 416 is located in the turning part 106, and the body 408 of the lock may comprise the members 412, 414. The function of the members 412, 414 is to further regulate the blocking force of the bending spring bar 416.

Figure 4E:
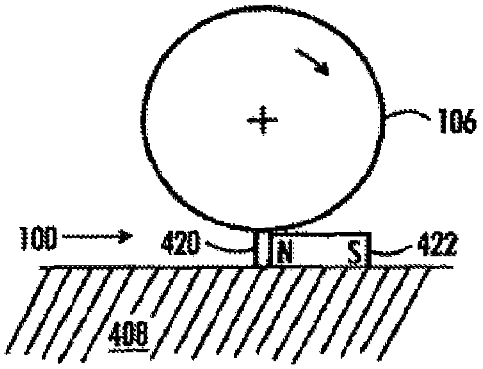
Figure 4F:
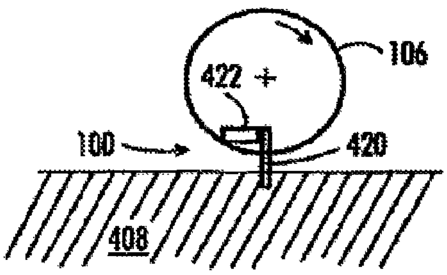

In FIG. 4E, the threshold device 100 comprises a magnet 422 in the body 408 of the lock. The turning part 106 of the lock may comprise a member 420 made of magnetic metal. Also such an embodiment is feasible, illustrated in FIG. 4F, where the magnet 422 is located in the turning part 106, and the body 408 of the lock may comprise the member 420.

Other techniques for implementing the threshold device 100 capable of controlling the power transmission mechanism 102 may also be utilized. Such techniques include, but are not limited to, a bar and a spring, and a spring bar. Basically, the threshold device needs 100 to be able to exercise friction on the power transmission mechanism 102. Another kind of approach for the threshold device 100 will be explained with reference to FIG. 7.

FIG. 8 illustrates the technical effect obtained with the use of the threshold device 100. The applicant has built a prototype of the lock, with which some experiments have been made. Curves depict an output voltage (y axis) of the generator 104 as a function of time (x axis). Table 1 illustrates how the different curves have been produced: by a strong or a weak user and with or without the use of the threshold device.

TABLE 1

Explanation of FIG. 8

| Curve | Strength of user | Threshold device used |
|---|---|---|
| 800 | Strong | No |
| 802 | Strong | Yes |
| 804 | Weak | No |
| 806 | Weak | Yes |

When comparing the curves, the effect of the threshold device 100 becomes clear: it standardizes the output by setting the minimum level of the voltage to a certain degree so that also a weak user is capable of producing enough mechanical power for powering the electronic circuit 108 and the actuator 116.

FIG. 9A illustrates an embodiment of the turn-powered electromechanical lock. In angle 900 the lock is in the locked state. After the user starts to turn the key 112 or knob 200, for example, in clockwise direction, the threshold device 100 releases the power transmission mechanism 102 in angle 902. Between angles 902 and 904, the generator 104 produces enough electric power for the electronic circuit 108 and the actuator 116. If the data read from the key 112 matches the predetermined criterion, the actuator 116 sets the lock in a mechanically openable state in angle 904. Between angles 904 and 906, the lock is set to the open state, provided that the actuator 116 set the lock in the mechanically openable state before angle 904. After angle 906, the bolt may be mechanically operated by the user, provided that the lock was set to the open state between angles 904 and 906. The clutch coupled with the actuator 116 may be operated between angles 904 and 906, for example. An anti-clockwise operation may also be possible, then angles 908, 910 and 912 may correspond to the angles 902, 904 and 906. As illustrated in FIGS. 1, 2 and 3, the lock may further comprise position sensors 110, 120, capable of recognizing the angle 904 and/or 910.

Figure 5:
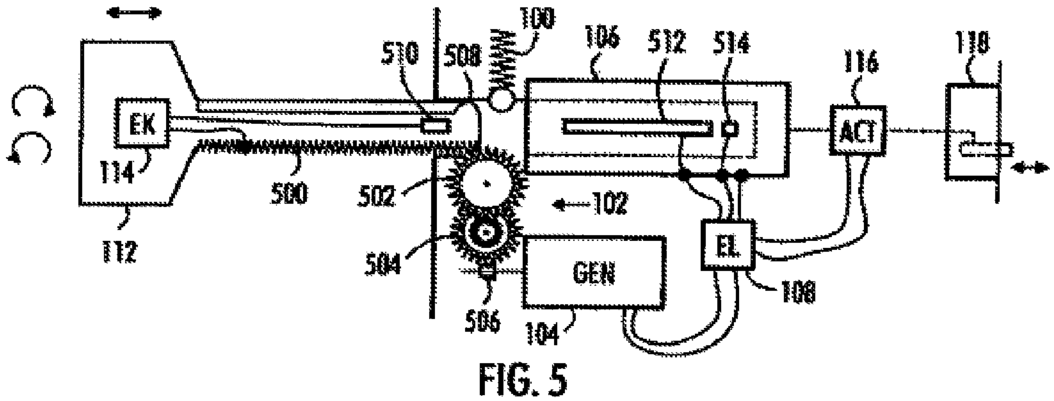
FIGS. 5, 6 and 7 illustrate various embodiments of a push-powered electromechanical lock.
Figure 6:
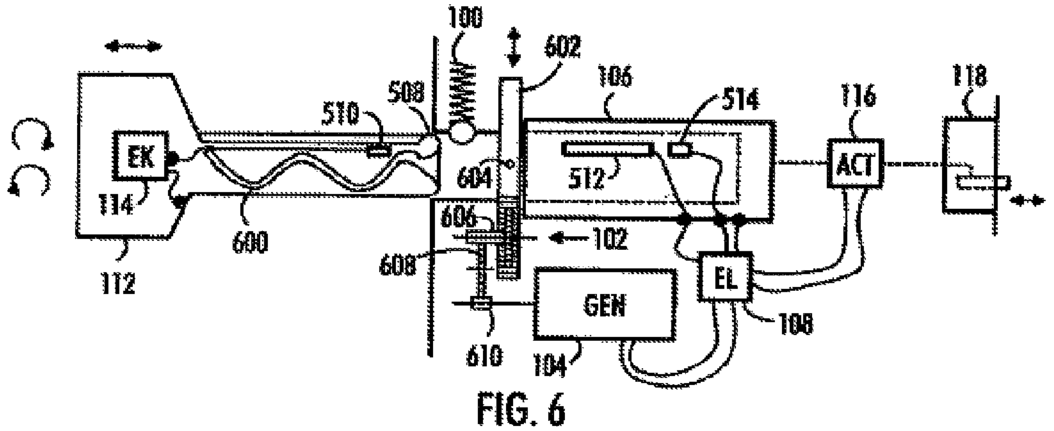
Figure 7:
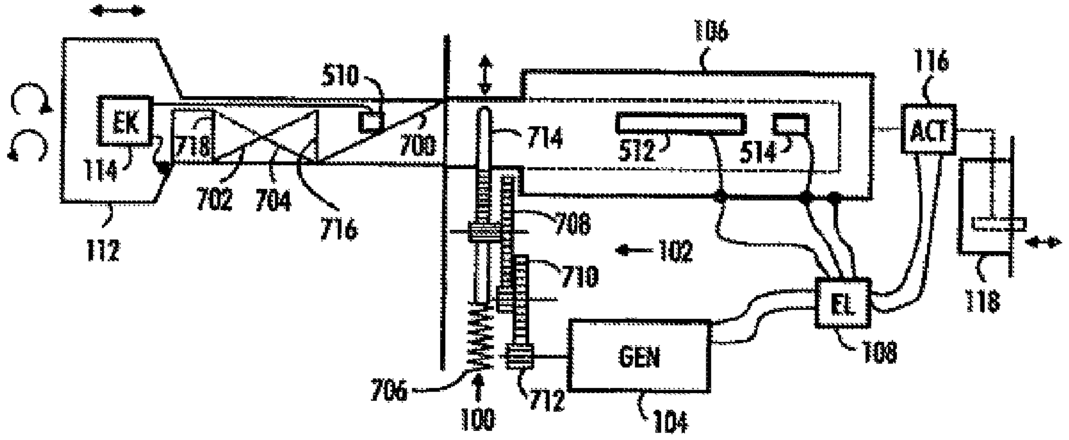

FIGS. 5, 6 and 7 illustrate various embodiments of a push-powered electromechanical lock. In these embodiments, the power transmission mechanism 102 comprises a mechanism to receive the mechanical power while the user is inserting the key 112 into the lock. Besides these, other suitable insertion mechanisms may be used as the power transmission mechanism 102 as well.

In FIG. 5, the power transmission mechanism 102 is implemented as follows: the power transmission mechanism 102 comprises a spur gear 502 rotatable by a spur track 500 of the key 112. There may be a gear 504 between the spur gear 502 and the generator shaft 506. When the user of the lock is inserting the key 112 in the lock, as a part of the opening process, the spur track 500 rotates the spur gear 502 that rotates the generator shaft 506 through the gear 504.

As can be seen in FIG. 5, the threshold device 100 may be implemented by a ball (or a roll) and a spring. When a protrusion 508 in the key 100 meets the threshold device 100 during the insertion, a friction develops between the protrusion 508 and the threshold device 100. The predetermined force is capable of overcoming the friction, whereupon the threshold device 100 releases the key 112, and the friction diminishes as the protrusion 508 has by then passed the threshold device 100, and between the ball and the side of the key 112 there is little or no contact.

During the insertion of the key 112, a contact 510 in the key is connected with a sliding contact 512 connected with the electronic circuit 108. A position sensor 514 connected with the electronic circuit 108 may recognize the depth of the insertion.

In FIG. 6, the power transmission mechanism 102 is implemented as follows: the power transmission mechanism 102 comprises a plunge 602 movable by a groove 600 of the key 112. There may be two gears 606, 608 between the plunge 602 and the generator shaft 610. When the user of the lock is inserting the key 112 in the lock, as a part of the opening process, a pin 604 fixed to the plunge 602 follows the groove 600, whereby the plunge 602 moves up and down. The lower part of the plunge 602 is formed as a spur track. The spur track of the plunge 602, while moving up and down, rotates the gear 606 that rotates the generator shaft 610 through the gear 608.

In FIG. 7, the power transmission mechanism 102 is implemented as follows: the power transmission mechanism 102 comprises a spring-loaded 706 pin 714 movable by a guide 700, 702 of the key 112. There may be two gears 708, 710 between the pin 714 and the generator shaft 712. When the user of the lock is inserting the key 112 in the lock, as a part of the opening process, the pin 714 follows the guide 700, whereby the pin 714 first moves down at the same time compressing the spring 706. The middle part of the pin 714 is formed as a spur track. The spur track of the pin 714, while moving down, rotates the gear 708 that rotates the generator shaft 712 through the gear 710. After the key 112 has been inserted to a point where the downward sloping groove 700 changes into the vertical groove 716, the pin 714 hurtles upward as the compressed spring 706 expands, whereby the spur track of the pin 714, while moving up, rotates the gear 708 that rotates the generator shaft 712 through the gear 710. While the insertion of the key 112 continues, grooves 702 and 718 cause a replication of the operation caused by the grooves 700 and 716. In order to enable the withdrawal of the key 112, it may comprise a return guide 704.

Figure 11:
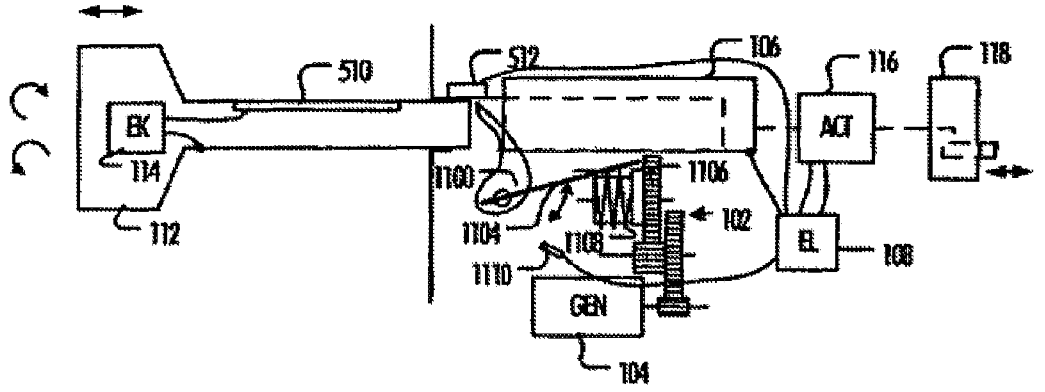
FIGS. 11 and 12 illustrate further embodiments of the electromechanical lock.
Figure 13A:
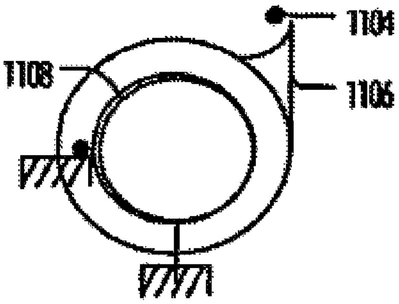
FIGS. 13A, 13B, 13C, 14A, 14B and 14C illustrate the operation of these embodiments.
Figure 13B:
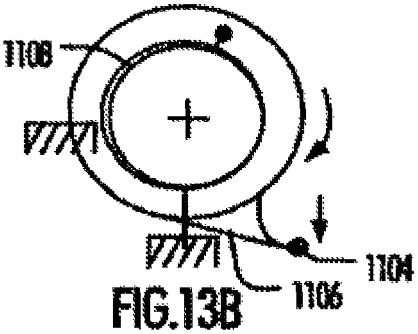
Figure 13C:
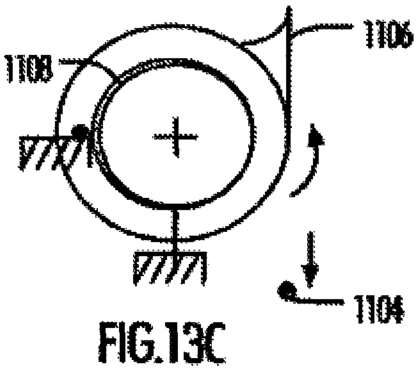

FIG. 11 illustrates a further embodiment of the electromechanical lock, and FIGS. 13A, 13B and 13C illustrate its operation. A hook 1100 is turned by inserting the key 112 into the lock. An arm 1104 is coupled to the hook 1100. The arm 1104 is in the home position when the key 112 is not present, as illustrated in FIG. 13A. A spring 1108 is coupled to a loading wheel 1106, which turns the gear when the arm 1104 is moving. The loading wheel 1106 is turned and the spring 1108 is loaded until the predetermined threshold is reached, as illustrated in FIG. 13B, and the spring 1108 turns the loading wheel 1106 back to the home position producing electric power with the generator 104, as illustrated in FIG. 13C. A position sensor 1110 is activated when the arm 1104 passes or reaches the position sensor 1110, or, alternatively, the previously illustrated contact 510 and the position sensor 514 may be used.

Figure 12:
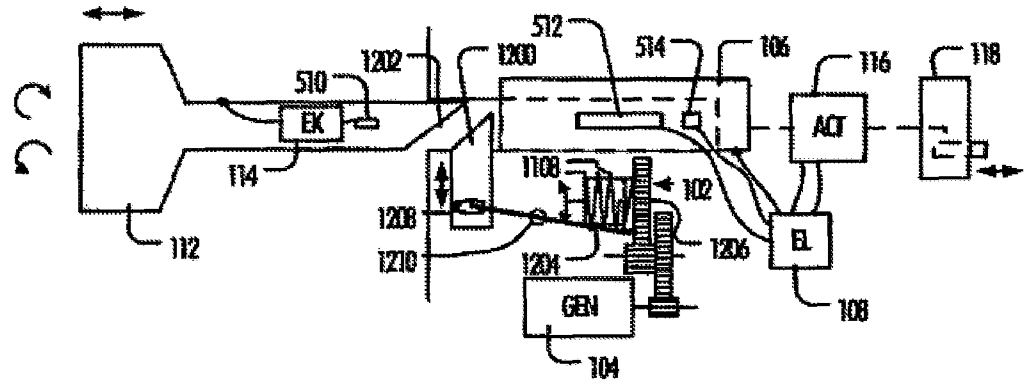
Figure 14A:
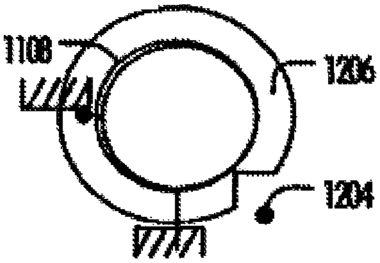
Figure 14B:
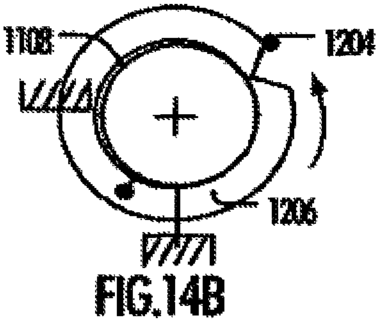
Figure 14C:
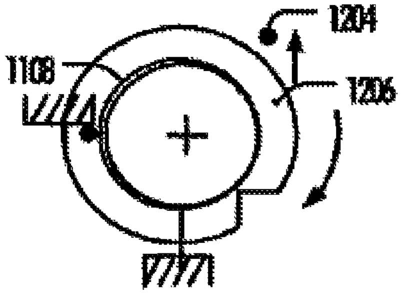

FIG. 12 illustrates another further embodiment of the electromechanical lock, and FIGS. 14A, 14B and 14C illustrate its operation. A slide 1200 is pushed in by a form 1202 while inserting the key 112 into the lock. An arm 1204 is coupled to the slide 1200 by a joint 1208. The arm 1204 is turned around a joint 1210 when the slide 1200 is moving. The slide 1200 is pushed out by a spring 1212. The arm 1204 is in the home position when the key 112 is not present, as illustrated in FIG. 14A. The spring 1108 is coupled to loading wheel 1206, which turns the gear when the arm 1204 is moving. The loading wheel 1206 is turned and the spring 1108 is loaded until the predetermined threshold is reached, as illustrated in FIG. 14B, and the spring 1108 turns the loading wheel 1206 back to the home position producing electric power with the generator 104, as illustrated in FIG. 14C. FIG. 12 also illustrates that the electronic circuit 114 may be placed nearer to the tip of the key 112; such a configuration shortens the needed connection from the electronic circuit 114 to the contact 510, for example.

On the whole, a method for operating an electromechanical lock may be described as follows: receiving mechanical power produced by a user of the lock; controlling the reception of the mechanical power so that a mechanical tension rises until a predetermined force threshold is exceeded, whereupon the mechanical tension transforms to an action received as the mechanical power; producing electric power from the mechanical power; reading data from a key with the electric power; and setting the lock in a mechanically openable state with the electric power, provided that the data matches a predetermined criterion.

Figure 10:
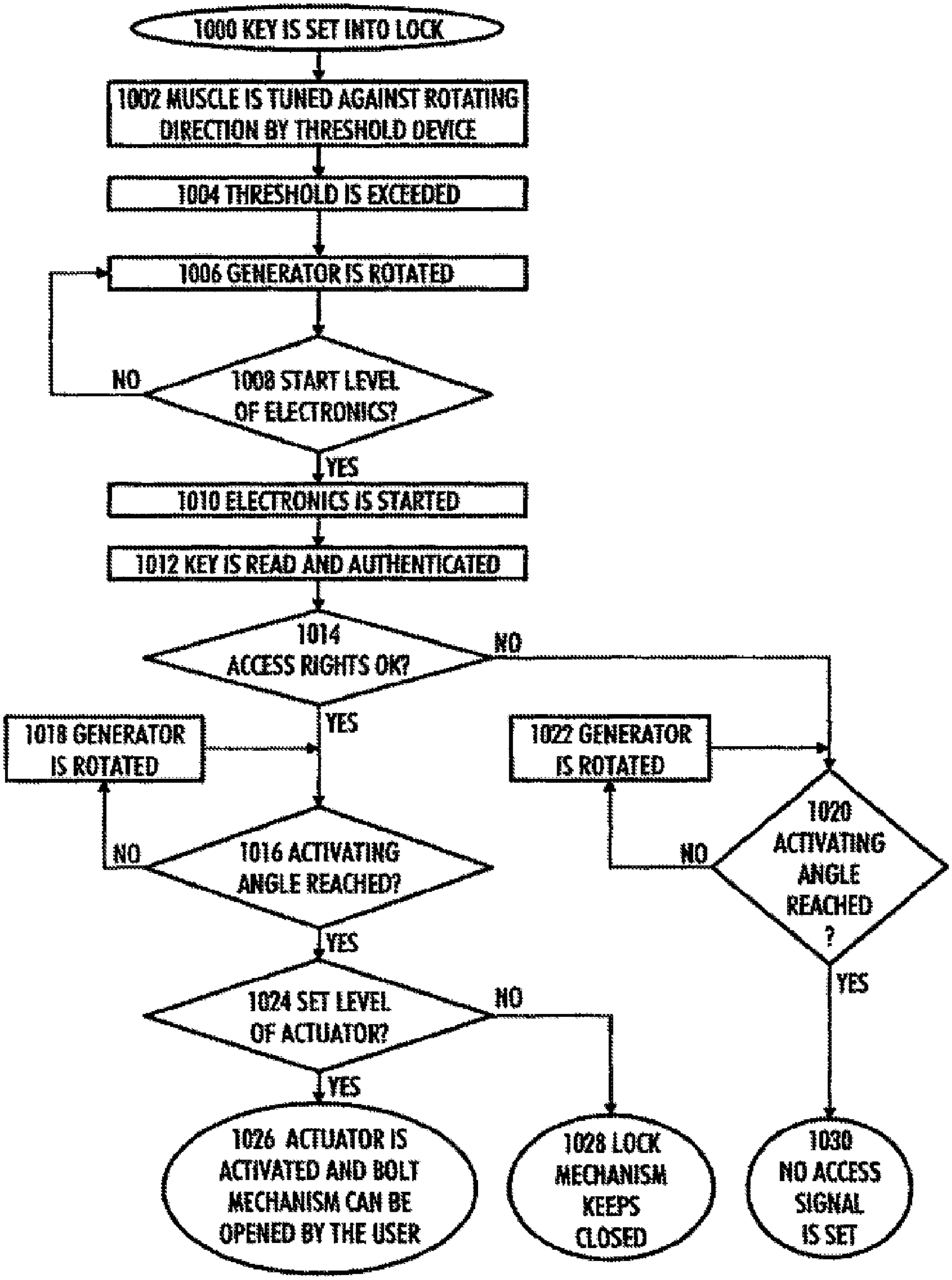
FIG. 10 is a flow chart illustrating a method for operating an electromechanical lock.

With reference to FIG. 10, let us examine an embodiment of this method. In 1000, the key is set into the lock. In 1002, the muscle of the user is tuned against the rotation direction of the lock by the threshold device. In 1004, the predetermined force threshold is exceeded. In 1006, the main shaft of the generator is rotated, whereby the electric power is produced. In 1008, a check is made: does the voltage of the produced electric power exceed a start level of the electronics? If it does not, there is not enough electric power to power the electronic circuit, and operation 1006 has to be repeated. If it does, the electronics are started in 1010. In 1012, the key is read and authenticated. In 1014, a check is made: is the access right of the key in order? If it is not, another check in 1020 is entered: is the activating angle reached? If it is not, generator is further rotated in 1022; it if is, no access signal is set in 1030, i.e. a red led lamp on the key is lit in order to make it clear for the user that the lock cannot be opened with the key. If the check in 1014 resulted in a positive answer, i.e. access right was in order, another check is made in 1016: is the activating angle reached? If it is not, generator is further rotated in 1018; it if is, still another check is made in 1024: does the voltage of the produced electric power exceed a set level of the actuator at this stage?

If it does, the actuator is activated and the user may arrange the lock to the open state, and the bolt mechanism may be operated (by further rotating the key) in 1026; if it does not, the actuator is not activated and the lock mechanism keeps closed in 1028. It is to be noted that the operation 1028 basically means that the lock is openable with the key: there was not only enough electric power for powering the actuator. Therefore, the user may try to do a new turning of the key, and if enough electric power is produced, the operation 1026 may finally be entered.

FIG. 9B illustrates electric power curves: curves depict an output voltage (y axis) of the generator 104 as a function of time (x axis). Curve 920 gathers enough voltage until the turning angle $\alpha$ so that the actuator has enough power for setting the lock in a mechanically openable state. During time period $\Delta t$ the voltage reaches the set level required by the actuator, also the match of read data with the predetermined criterion is performed during this period; before this period, enough power is gathered for starting the electronics and reading the data from the key.

Supposed that angle $\alpha$ corresponds with the angle 904 of FIG. 9A and with the activating angle of FIG. 10, curves 922 and 924 may be interpreted: curve 922 does gather enough power for reading the data from the key, but not enough power for setting the actuator; curve 924 does not even gather enough power for reading the data from the key. With the use of the threshold device 100, the angle 920 becomes the predominant one.

Even though the invention has been described above with reference to an example according to the accompanying drawings, it is clear that the invention is not restricted thereto but it can be modified in several ways within the scope of the appended claims. Especially it is to be noted that the design and dimensioning of the mechanical parts, such as the various gears, gear wheels, pins, guides, spur tracks, and the like, is only exemplary: the number of the parts and their dimensioning may vary depending on the lock type and the generator type, for example.

The invention claimed is:

1. An electromechanical lock, comprising:

a power transmission mechanism to receive mechanical power produced by a user of the electromechanical lock, wherein the power transmission mechanism comprises a mechanism to receive the mechanical power while the user is inserting a key into the electromechanical lock;

a generator to produce electric power from the mechanical power;

an electronic circuit, powered by the electric power, coupleable with the key, to read data from the key, and to issue an open command provided that the data matches a predetermined criterion;

a threshold device to control the power transmission mechanism, wherein the threshold device is configured to not release the power transmission mechanism until a mechanical tension exceeds a predetermined force threshold, such that the mechanical tension does not transform to an action producing the mechanical power received by the power transmission mechanism until the mechanical tension exceeds the predetermined force threshold; and an actuator, powered by the electric power, to receive the open command, and to set the electromechanical lock in a mechanically openable state, wherein the threshold device is configured to control the power transmission mechanism so that the amount of the received mechanical power in the form of the electric power is sufficient for powering the electronic circuit and the actuator, and so that a normal operation of the electromechanical lock, including an insertion of the key into the electromechanical lock, is sufficient for power the electronic circuit and the actuator.

2. The electromechanical lock of claim 1, wherein the threshold device is configured to control a muscular tension of a user of the electromechanical lock, a spring, or a mechanical energy storage.

3. The electromechanical lock of claim 1, wherein the threshold device is configured so that one operating cycle of the power transmission mechanism by a user of the electromechanical lock is sufficient for powering the electronic circuit and the actuator.

4. The electromechanical lock of claim 1, wherein the power transmission mechanism comprises a main shaft of the electromechanical lock, which is rotated during the reception of the mechanical power.

5. The electromechanical lock of claim 4, wherein the generator comprises a generator shaft, and the electromechanical lock further comprises a gear between the main shaft of the electromechanical lock and the generator shaft.

6. The electromechanical lock of claim 1, wherein the power transmission mechanism comprises a spur gear rotatable by a spur track of the key, or a plunge movable by a groove of the key, or a spring-loaded pin movable by a guide of the key.

7. The electromechanical lock of claim 1, wherein the threshold device comprises a ball or a roll and a spring, a bar and a spring, a magnet, a spring bar, or a bending spring bar.

8. The electromechanical lock of claim 1, wherein the electronic circuit is configured to recognize the following states: the electromechanical lock is in the mechanically openable state; the electromechanical lock is closed and the data does not match the predetermined criterion; and the electromechanical lock is closed and there was not enough electric energy to read the data from the key and to check the match of the data by the electronic circuit or to place the electromechanical lock in the mechanically openable state by the actuator.

9. The electromechanical lock of claim 1, wherein the electronic circuit is configured to provide a signal for the key if the open command is not issued because the data does not match the predetermined criterion, so that the key informs the user that the data did not match the predetermined criterion.

10. The electromechanical lock of claim 9, wherein the electronic circuit is configured to provide electric power for the key, so that the key informs the user with the electric power received from the electronic circuit.

11. An electromechanical lock, comprising:

receiving means for receiving mechanical power produced by a user of the electromechanical lock, wherein the receiving means comprises a mechanism to receive the mechanical power while the user is inserting a key into the electromechanical lock;

producing means for producing electric power from the mechanical power;

reading and issuing means, powered by the electric power, coupleable with the key, for reading data from the key, and issuing an open command provided that the data matches a predetermined criterion;

controlling means for controlling the receiving means to not release the receiving means until a mechanical tension exceeds a predetermined force threshold, such that the mechanical tension does not transform to an action producing the mechanical power received by the receiving means until the mechanical tension exceeds the predetermined force threshold; and receiving and setting means, powered by the electric power, for receiving the open command, and setting the electromechanical lock in a mechanically openable state, wherein the controlling means controls the receiving means so that the amount of the received mechanical power in the form of the electric power is sufficient for powering the reading and issuing means and the receiving and setting means, and so that a normal operation of the electromechanical lock, including an insertion of the key into the electromechanical lock, is sufficient for powering the reading and issuing means and the receiving and setting means.

12. The electromechanical lock of claim 11, wherein the controlling means controls a muscular tension of a user of the electromechanical lock, a spring, or a mechanical energy storage.

13. The electromechanical lock of claim 11, wherein the controlling means controls the receiving means so that one operating cycle of the power transmission mechanism by a user of the electromechanical lock is sufficient for powering the electronic circuit and the actuator.

14. The electromechanical lock of claim 11, wherein the receiving means comprises a main shaft of the electromechanical lock, which is rotated during the reception of the mechanical power.

15. The electromechanical lock of claim 14, wherein the producing means comprises a generator shaft, and the electromechanical lock further comprises a gear between the main shaft of the electromechanical lock and the generator shaft.

16. The electromechanical lock of claim 11, wherein the receiving means comprises a spur gear rotatable by a spur track of the key, or a plunge movable by a groove of the key, or a spring-loaded pin movable by a guide of the key.

17. The electromechanical lock of claim 11, wherein the controlling means comprises a ball or a roll and a spring, a bar and a spring, a magnet, a spring bar, or a bending spring bar.

18. The electromechanical lock of claim 11, wherein the reading and issuing means is for recognizing the following states: the electromechanical lock is in the mechanically openable state; the electromechanical lock is closed and the data does not match the predetermined criterion; and the electromechanical lock is closed and there was not enough electric energy to read the data from the key and to check the match of the data by the reading and issuing means or to place the electromechanical lock in the mechanically openable state by the receiving and setting means.

19. The electromechanical lock of claim 11, wherein the reading and issuing means is for providing a signal for the key if the open command is not issued because the data does not match the predetermined criterion, so that the key informs the user that the data did not match the predetermined criterion.

20. The electromechanical lock of claim 19, wherein the reading and issuing means is for providing electric power for the key, so that the key informs the user with the electric power received from the reading and issuing means.

21. A method for operating an electromechanical lock, comprising:

receiving mechanical power produced by a user of the electromechanical lock while the user is inserting a key into the electromechanical lock;

controlling the reception of the mechanical power so that the mechanical tension does not transform to an action received as the mechanical power until the mechanical tension exceeds the predetermined force threshold;

producing electric power from the mechanical power;

reading data from a key with the electric power; and controlling the reception of the mechanical power so that the amount of the received mechanical power, from a normal operation of the electromechanical lock, including an insertion of the key into the electromechanical lock, is sufficient for setting the electromechanical lock in a mechanically openable state with the electric power, provided that the data matches a predetermined criterion.

* * * * *